United States Patent [19]
Chung et al.

[11] Patent Number: 6,153,717
[45] Date of Patent: Nov. 28, 2000

[54] POLYSILOXANE CONTAINING TERTIARY AMINE GROUPS AND METHOD OF PREPARING THE SAME

[75] Inventors: Lie-Zen Chung, Hsinchu; Yuan-Der Wu, San-Chung, both of Taiwan

[73] Assignee: Industrial Technology Research Institute, Hsinchu, Taiwan

[21] Appl. No.: 09/063,420

[22] Filed: Apr. 20, 1998

[30] Foreign Application Priority Data

May 19, 1997 [TW] Taiwan ................................ 86106627

[51] Int. Cl.⁷ .......................... C08G 77/26; C08G 77/04; C08G 77/06; D06M 15/643
[52] U.S. Cl. ................................ 528/28; 528/12; 528/14; 528/38; 252/8.63
[58] Field of Search .................. 528/28, 12, 14, 528/38; 252/8.63

[56] References Cited

U.S. PATENT DOCUMENTS

| | | | |
|---|---|---|---|
| 3,389,160 | 6/1968 | Reid | 556/423 |
| 4,409,267 | 10/1983 | Ichinohe et al. | 427/387 |
| 5,223,170 | 6/1993 | Ohashi et al. | 252/174.15 |
| 5,277,968 | 1/1994 | Canivenc | 428/245 |
| 5,688,889 | 11/1997 | Canivenc et al. | 528/40 |

*Primary Examiner*—Robert Dawson
*Assistant Examiner*—Jeffrey B. Robertson
*Attorney, Agent, or Firm*—Thomas, Kayden, Horstemeyer & Risley

[57] ABSTRACT

This invention relates to a polysiloxane with a comb-like structure and with tertiary amine groups, and the method of preparing the same. The polysiloxane of the invention does not include any active hydrogen groups so that the amount of the amine groups can increase, which in turn improves the effect of self-emulsification. This makes the polysiloxane applicable in water-soluble resins, for example as an accelerator in water-soluble epoxy resin or water soluble fiber dying treating agent. When used as fiber treatment agent, the polysiloxane will not cause yellowing.

14 Claims, 2 Drawing Sheets

POLYSILOXANE CONTAINING TERTIARY AMINE GROUPS AND METHOD OF PREPARING THE SAME

CROSS-REFERENCE TO RELATED APPLICATION

This application claims the priority benefit of Taiwan application serial no. 86106627, filed May 19, 1997, the full disclosure of which is incorporated herein by reference.

BACKGROUND OF THE INVENTION

1. Field of the Invention

The invention relates in general to a polysiloxane, and more particularly to a polysiloxane containing tertiary amine groups and having a comb-like structure for using as an anti-yellowing fiber treating agent.

2. Description of the Related Art

Organic polysiloxane is characterized by low surface tension, lubricating, softening and releasing properties. Therefore, it is usually utilized to modify the surface properties of other polymers. However before using, certain organic functional groups are firstly introduced to the polysiloxane so that the hydrophilic or hydrophobic property of the polysiloxane is adjusted, and some functional groups in the polysiloxane may react with the modified polymers to form permanent bonds. The categories and the amount, as well as the locations of the functional groups in the polysiloxane will influence not only the properties of the polysiloxane itself but also the properties of the modified polymers.

Reactive hydrophilic amine groups are one of the commonest functional groups introduced to polysiloxane. Polysiloxane with such amine groups is usually applied to modify resins, or used as additive for paint and ink, or as post-treating agent for fibers.

When applied in paint, polysiloxane with amine groups improves the paint with luster and surface protection, and improves the durability of the paint. It is usually formulated in metal paint and floor paint as disclosed in U.S. Pat. Nos. 3,856,733, 3,960,575, 4,247,330, 4,070,510, and 3,429,842.

When applied in fiber post-treatment, polysiloxane with amine groups improves the softness of the fibers. The friction between fibers results in slippery difficulty and thus actual uncomfort. If oily agent exists on the surface of the fibers, the friction therebetween can be reduced and the fabric becomes softer. However, the process of using polysiloxane as fiber treating agent has to be performed in water bath so that the amine groups can be introduced to the polysiloxane to increase its water solubility as disclosed in U.S. Pat. No. 4,725,635, Japan patent publication no. 56-45406, 54-131096 and 53-98499.

The polymerization processes provided by the above mentioned patents all use hydrolyzed silane and chain extenders, to polymerize. The polysiloxane thus formed usually has comb-like amine side chains with irregular intervals. Emulsifier has to be added or the amount of amine groups has to be increased to make the polymer uniformly dispersed. However, polysiloxane with higher amount of amine groups when used as fiber treating agent will cause yellowing. On the other hand, if the amount of the amine groups is limited to a certain degree, the molecular weight of the polysiloxane main chain is consequently limited, which will in turn limit the improvement of the softness of the fibers. The molecular weight of the hydrolyzed silane with amine groups will limit the molecular weight of the ring-opened polysiloxane.

The above-mentioned polysiloxane with amine groups is commercialized, for example, 531, 536 of Dow Corning corp., 784, 785 of SWS corp., and 2133, 2135 of GE corp.

FIG. 1 illustrates the molecular structure of a conventional polysiloxane with primary amine groups. The main chain of the polysiloxane determines the lubricating, releasing and softening properties. The side chains with amine groups determine the dispersibility and reactivity. Therefore, the application of the polysiloxane with amine groups is limited by the amount of the amine groups and the locations of the side chains.

The conventional preparation includes adding 100 g of γ-3-propyldimethylaminodimethoxysilane into a reactor, and adding 7 g of water, keeping at a temperature between 60~80° C. to proceed a hydrolysis reaction. Finally, a hydrolyzed prepolymer with primary amine groups, having a viscosity of 100~200 cps, is then obtained. Polysiloxane with primary amine groups, having a viscosity of about 800~1000 cps, can be obtained by firstly adding 16 g of the hydrolyzed prepolymer with primary amine groups and 184 g of octamethyltetracyclosiloxane into a reaction bottle and then adding 0.5 g of potassium hydroxide, stirring and heating up to 130° C. for 3~4 hours.

This polysiloxane contains primary amine groups which have active hydrogen groups will result in fiber yellowing when it is applied in fiber processing.

SUMMARY OF THE INVENTION

It is therefore an object of the invention to provide a polysiloxane with tertiary amine groups so that yellowing of the fibers can be avoided when the polysiloxane is used in fiber treatment.

It is another object of the invention to provide a method for preparing a polysiloxane with tertiary amine groups, including preparing silane monomer with tertiary amine groups and its prepolymer, and further including polymerizing this prepolymer with chain extender by molecular rearrangement to form such polysiloxane.

It is a further object of the invention to provide a polysiloxane with tertiary amine groups and with a comb-like structure.

BRIEF DESCRIPTION OF THE DRAWINGS

These and other objects, features, and advantages of the invention will become apparent from the following detailed description of the preferred but non-limiting embodiments. The description is made with reference to the accompanying drawings in which.

Table 1~2 show the fabric properties and the yellowing effects of the conventional polysiloxane with primary amine groups and the polysiloxane with tertiary amine groups according to the invention.

DESCRIPTION OF THE PREFERRED EMBODIMENT

The molecular structure of the polysiloxane with tertiary amine groups according to the invention is illustrated in FIG.

2. For every y chain, there is at least one tertiary amine side chain. The tertiary amine side chains are distributed irregularly in the whole polysiloxane molecule. The hydrolysis degree x can be used to adjust the molecular weight of the polysiloxane. With proper x and y, polysiloxane with desired dispersibility and reactivity can be obtained. When used as fiber treating agent, the polysiloxane with tertiary amine groups will not cause fiber yellowing during heating since it does not contain any active hydrogen group.

Figure 1:
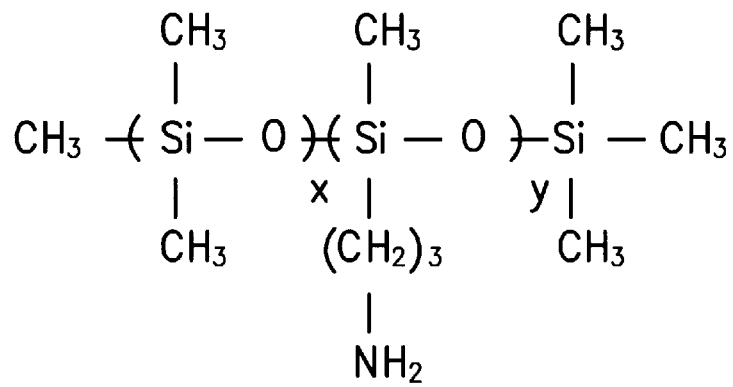
FIG. 1 is the molecular structure of a conventional polysiloxane with primary amine groups.
Figure 2:
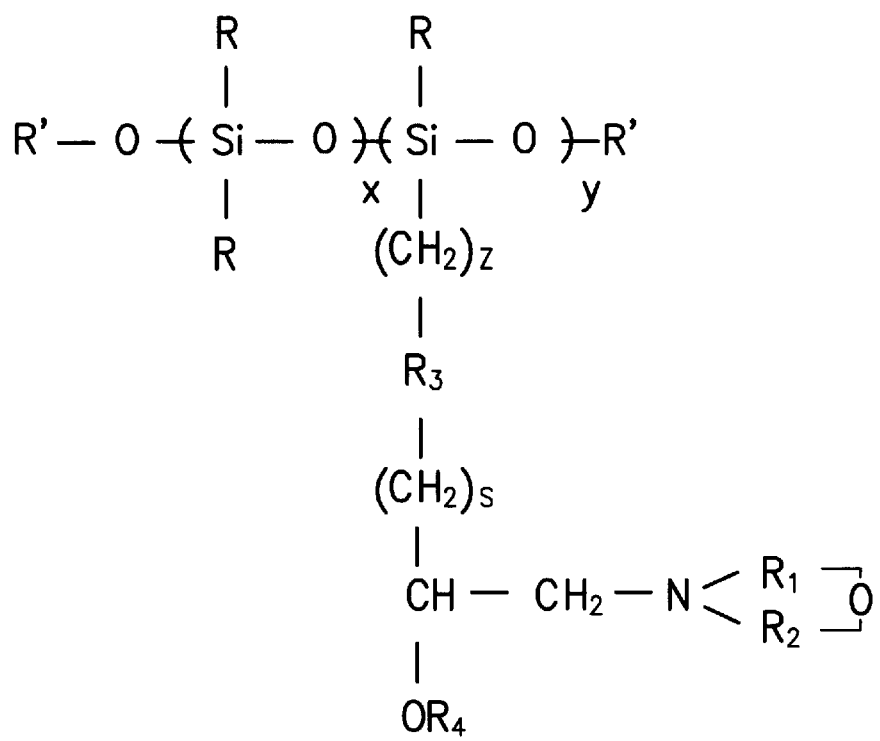
FIG. 2 is the molecular structure of the polysiloxane with tertiary amine groups according to the invention.

Referring to FIG. 2, R' is a $C_1$ to $C_4$ alkyl group, such as methyl group, ethyl group, propyl group, isopropyl group, butyl group, secondary butyl group, or tertiary butyl group. R is a $C_1$ to $C_4$ alkyl group or phenyl group. $R_1$ and $R_2$ are both alkyl groups which are connected with a ring system having an oxygen thereon. $R_3$ is oxygen or sulfur, Z is an integer between 3~5, $R_4$ is hydrogen, X is an integer between 100~400, Y is an integer between 5~100, and S is an integer equal to 1.

Figure 3:
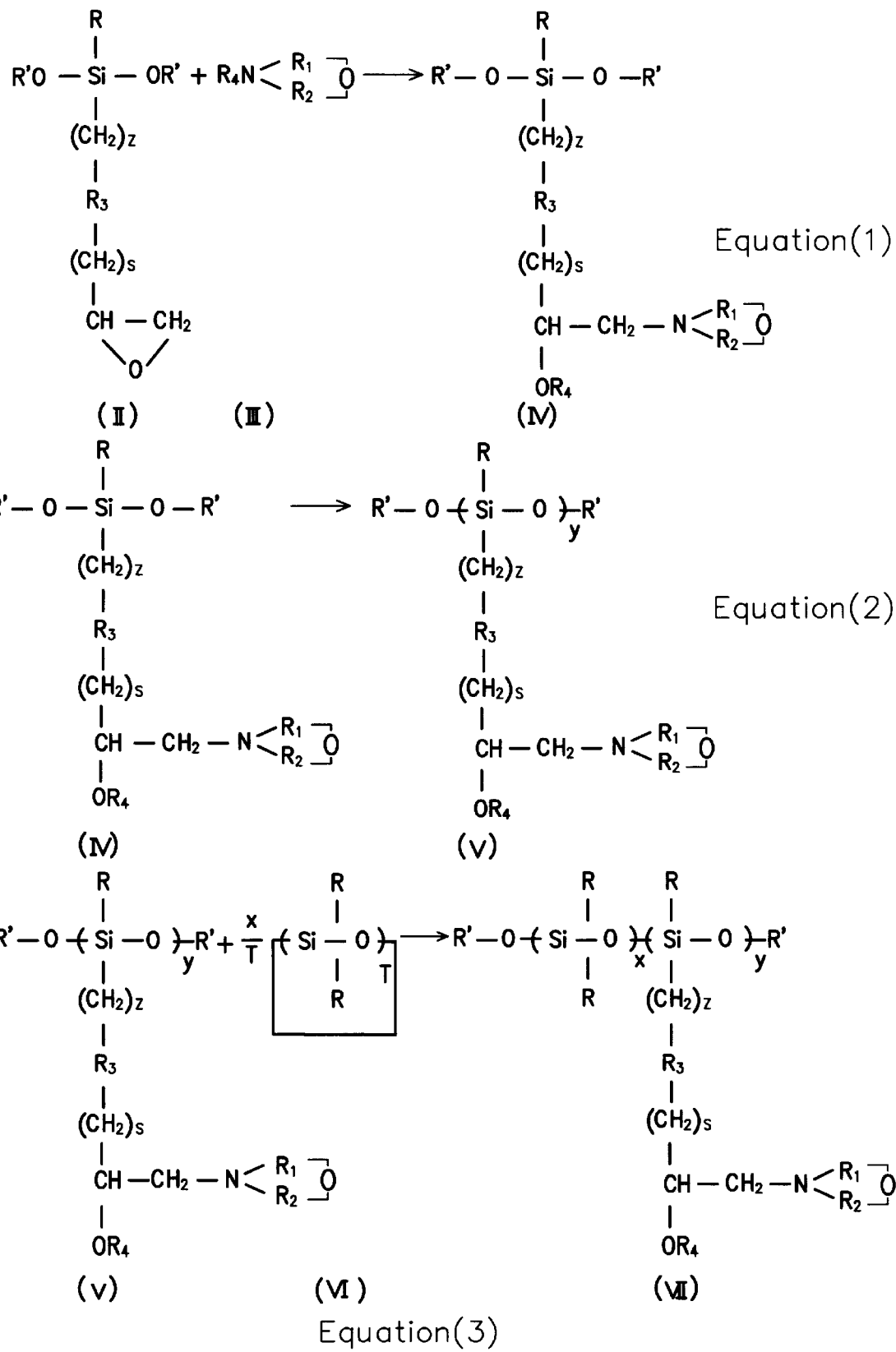
FIG. 3 illustrates the reaction equations showing the preparation of the polysiloxane with tertiary amine groups according to the invention.

To prepare polysiloxane with tertiary amine groups and with a comb-like structure, silane monomer with tertiary amine groups has to be prepared firstly. Referring to FIG. 3, equation (1), compound (II) and compound (III) react to form silane monomer (IV). The weight ratio of compound (II) to compound (III) would range from 1:1 to 1:1.2. The reaction temperature can be at 25~100° C., preferably at 50~60° C. The reaction time can be 1~3 hours. The functional group R' in the compound (II) is $C_1$ to $C_4$ alkyl group, such as methyl group, ethyl group, propyl group, isopropyl group, butyl group, secondary butyl group, or tertiary butyl group. R is $C_1$ to $C_4$ alkyl group or phenyl group. Z is an integer between 3~5, and S is an integer equal to 1. $R_3$ is oxygen or sulfur. $R_4$ in the compound (III) is hydrogen, and $R_1$ and $R_2$ are both alkyl groups which are connected with a ring system having an oxygen thereon.

Equation (2) of FIG. 3 illustrates the preparation of the hydrolyzed prepolymer of polysiloxane with tertiary amine groups. With the existence of catalyst and water, silane monomer (IV) is hydrolyzed first and then polymerized to form hydrolyzed prepolymer (V). The reaction temperature can be at 25~120° C., preferably, at 40~60° C. The reaction time can be about 0.5~5 hours, preferably 2~4 hours. The catalyst used is a basic catalyst, such as sodium hydroxide, or potassium hydroxide, or a Lewis acid. Furthermore, the reaction of Equation (2) may proceed without a catalyst. The viscosity of the hydrolyzed prepolymer (V) can be 500~4000 cps, preferably 700~3500 cps.

Equation (3) of FIG. 3 illustrates the preparation of polysiloxane with tertiary amine groups. The hydrolyzed prepolymer (V) and the cyclic siloxane (VI) react to form polysiloxane with tertiary amine groups (VII) by ring opening polymerization. The functional group R of cyclic siloxane (VI) can be either an alkyl group or a phenyl group with a carbon number of 1~4. T is an integer between 3~7. X of the polysiloxane with tertiary amine group (VII) is an integer between 100~400. The weight ratio of prepolymer (V) to cyclic siloxane (VI) ranges from 1:95 to 1:75. The reaction temperature can be at 50~180° C., preferably at 100~150° C. The reaction time can be 2~8 hours. The catalyst used in this reaction can be a basic catalyst such as potassium hydroxide or sodium hydroxide. The amine content of the polysiloxane with tertiary amine groups according to the invention can be 2~15%, preferably 8~10%. The viscosity of the polysiloxane with tertiary amine groups is 500~7000 cps, preferably 4000~5000 cps.

One characteristic of the invention is that the amine groups of the polysiloxane are tertiary amine groups. Although the tertiary amine groups are not uniformly distributed in the polysiloxane main chain, the total amount of the tertiary amine groups could increase due to non-existence of active hydrogen groups. Therefore, when the polysiloxane is used as fiber post-treating agent, the softness of the fiber is increased while yellowing is avoided.

Another characteristic of the invention is that increasing the content of the tertiary amine groups will cause the polysiloxane to self-emulsify. Consequently, the polysiloxane with tertiary amine groups can be applied in water-soluble resins, for example, as the accelerator of the water-soluble epoxy resin or water soluble fiber dying treating agent.

EXAMPLE 1

Preparation of Silane Monomer with Tertiary Amine Groups (Compound IV)

110 g of 3-glycidyloxypropylmethyldimethoxysilane is added dropwise into a 1 litter reactor which contained 45 g of morpholine ($HN(CH_2)_4O$). The reaction temperature is adjusted to a little lower than 75~85° C. depending on the dropping speed. After reacting at 75~85° C. for 3 hours, silane monomer with tertiary amine groups is formed. The conversion rate is about 98~98.5%. The existence of silane monomer with tertiary amine groups is confirmed by FT-IR spectrometer. A big peak around 3000~3700 $cm^{-1}$ is detected because of the amine group of the morpholine. However, after 3 hours reaction this peak disappears. Moreover, a peak of hydroxyl group shows around 3000~3500 $cm^{-1}$ in the FT-IR spectrogram. Furthermore, the cyclic oxide group of the 3-glycidyloxypropylmethyldimethoxysilane shows a peak around 989 $cm^{-1}$ before the reaction but disappears after the reaction.

EXAMPLE 2

Preparation of Hydrolyzed Prepolymer with Tertiary Amine Groups (Compound V)

100 g of silane monomer with tertiary amine groups (Compound IV) is added into a 200 ml reactor, then 0.25 g of potassium hydroxide is added, and 5.2 g of water is added dropwise. After stirring and reacting at room temperature for 3~4 hours, silane monomer with tertiary amine groups is hydrolyzed and polymerized. The hydrolyzed prepolymer with tertiary amine groups is formed. After the reaction, the temperature would rise to about 70~80° C. and the viscosity is about 1500~2000 cps.

EXAMPLE 3

Preparation of Polysiloxane with Tertiary Amine Groups (Compound VII)

32 g of the hydrolyzed prepolymer of the polysiloxane with tertiary amine groups (Compound V), 276 g of octamethyltetracyclosilane and 7.7 g of potassium hydroxide are mixed in a reactor. The temperature is initially controlled at 70~80 ° C. and then rises up to 130° C. and reflux. As the reaction goes on, reflux is reduced and methanol is gradually produced in the condenser. The viscosity of the solution in the reactor is gradually increased to about 3500~4500 cps. When the reaction is ended, polysiloxane with tertiary amine groups with a comb-like structure is obtained.

One object of the invention is that the amine groups of the polysiloxane are tertiary amine groups. Moreover, even the tertiary amine groups do not disperse uniformly in the long chain polysiloxane, the total amount of the tertiary amine groups increases due to non-existence of active hydrogen group. Therefore, the dispersibility is maintained, the ductility of fiber is increased and yellowing is avoided.

Another object of the invention is that increasing the amount of the tertiary amine groups rises up the self-emulsion effect of the polysiloxane. Consequently, the polysiloxane with tertiary amine groups can be applied in water-soluble resin such as the enhancer of the water-soluble epoxy resin or water soluble fiber dying treating agent.

EXAMPLE 4

This example illustrates the advantages of the polysiloxane with tertiary amine groups of the invention. Conventional polysiloxane with primary amine groups and polysiloxane with tertiary amine groups of the invention are both emulsified and diluted to 2% solid content emulsions, respectively. Then, textile fabrics are processed through padding treatment with these two emulsions respectively and then bake at 70±5° C. for about 3 hours. The properties of the fabrics are then tested by KES-FB evaluation system. The result is shown in Table 1. The time when yellowing starts is shown in Table 2. From both tables, it is clear that the fabrics treated with polysiloxane of the invention is superior to the fabrics treated with conventional polysiloxane, both in softness and anti-yellowing properties.

TABLE 1

| PROPERTY | POLYSILOXANE WITH TERTIARY AMINE GROUPS OF THE INVENTION | CONVENTIONAL POLYSILOXANE WITH PRIMARY AMINE GROUPS |
| --- | --- | --- |
| HARDNESS | LOW | HIGH |
| SMOOTHNESS | HIGH | LOW |
| SOFTNESS | HIGH | LOW |

TABLE 2

| | POLYSILOXANE WITH TERTIARY AMINE GROUPS OF THE INVENTION | CONVENTIONAL POLYSILOXANE WITH PRIMARY AMINE GROUPS |
| --- | --- | --- |
| TIME WHEN YELLOWING STARTS | 72 HOURS | 1 HOUR AND 25 MINUTES |

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A polysiloxane with tertiary among groups, where said polysiloxane being represented by the following structure:

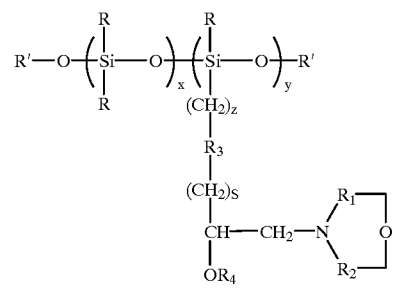

wherein:
(a) R' is a $C_1$ to $C_4$ alkyl group;
(b) R is a $C_1$ to $C_4$ alkyl group;
(c) $R_1$ and $R_2$ are both $C_2$ alkyl groups;
(d) $R_3$ is oxygen or sulfur;
(e) $R_4$ is hydrogen;
(f) X is an integer between 100~400;
(g) Y is an integer between 5~100;
(h) Z is an integer between 3~5; and
(i) S is the integer 1.

2. A method of preparing polysiloxane with tertiary amine groups, comprising the step of reacting a hydrolyzed prepolymer (V) with a cyclic siloxane (VI), where said step being represented by the following equation:

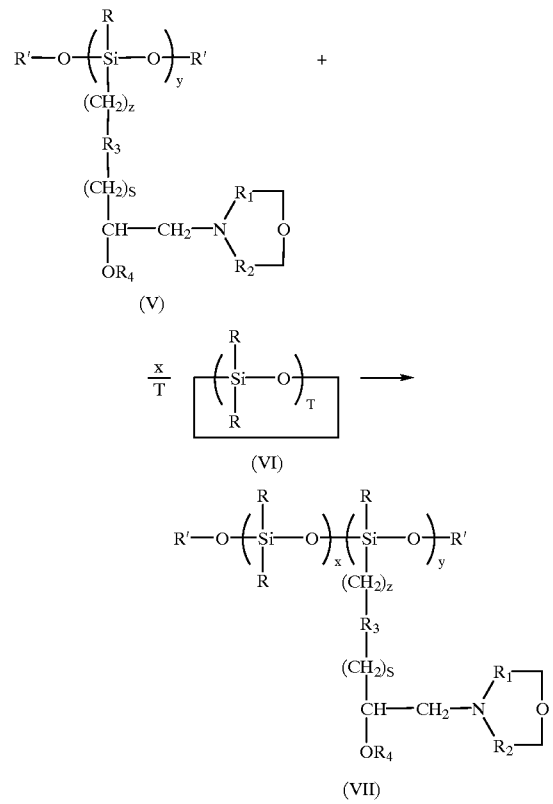

wherein:
(a) R' is a $C_1$ to $C_4$ alkyl group;
(b) R is a $C_1$ to $C_4$ alkyl group or phenyl group;
(c) $R_1$ and $R_2$ are both $C_2$ alkyl groups;
(d) $R_3$ is oxygen or sulfur;
(e) $R_4$ is hydrogen;
(f) X is an integer between 100~400;

(g) Y is an integer between 5~100;

(h) Z is an integer between 3~5;

(i) T is an integer between 3~7; and (j) S is the integer 1.

3. A method of preparing polysiloxane with tertiary amine groups as claimed in claim 2, further including using basic catalyst or a Lewis acid catalyst.

4. A method of preparing polysiloxane with tertiary amine groups as claimed in claim 2, wherein the weight ratio of the hydrolyzed prepolymer (V) to the cyclic siloxane (VI) ranges about 1:95 to 1:75.

5. A method of preparing polysiloxane with tertiary amine groups as claimed in claim 2, wherein the reaction temperature is about 50~180° C.

6. A method of preparing polysiloxane with tertiary amine groups as claimed in claim 2, if wherein the reaction time is about 2~8 hours.

7. A method of preparing polysiloxane with tertiary amine groups as claimed in claim 2, wherein said hydrolyzed prepolymer (V) being prepared by the following equations:

Equation (1)

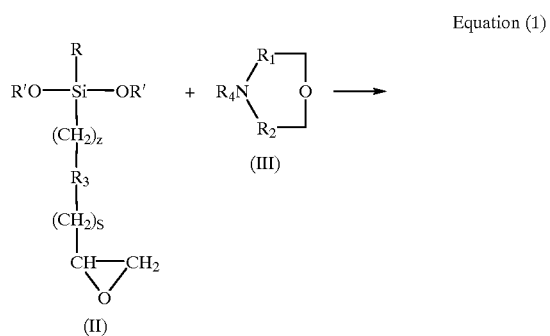

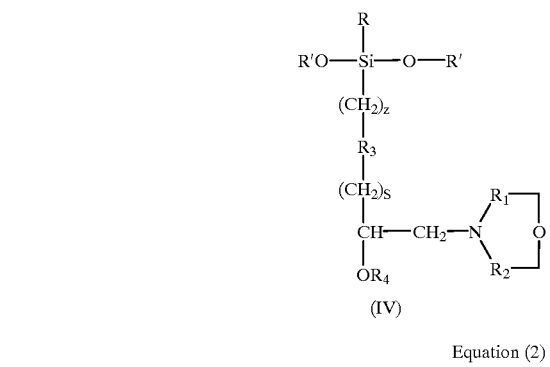

Equation (2)

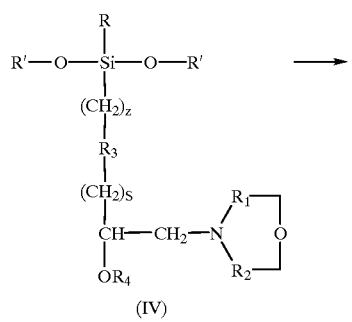

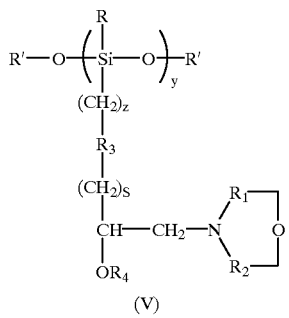

(V)

wherein:

(a) R' is a $C_1$ to $C_4$ alkyl group;

(b) R is a $C_1$ to $C_4$ alkyl group or phenyl group;

(c) $R_1$ and $R_2$ are both $C_2$ alkyl groups;

(d) $R_3$ is oxygen or sulfur;

(e) $R_4$ is hydrogen;

(f) Y is an integer between 5~100;

(g) Z is an integer between 3~5; and (h) S is the integer 1.

8. A method of preparing polysiloxane with tertiary amine groups as claimed in claim 7, wherein in Equation (1), the weight ratio of compound (II) to compound (III) ranges about 1:1 to 1:1.2.

9. A method of preparing polysiloxane with tertiary amine groups as claimed in claim 7, wherein in Equation (1), the reaction temperature is about 25~100° C.

10. A method of preparing polysiloxane with tertiary amine groups as claimed in claim 7, wherein in Equation (1), the reaction time is about 1~3 hours.

11. A method of preparing polysiloxane with tertiary amine groups as claimed in claim 7, wherein in Equation (2), the reaction temperature is about 25~120° C.

12. A method of preparing polysiloxane with tertiary amine groups as claimed in claim 7, wherein in Equation (2), the reaction time is about 2~4 hours.

13. A method of preparing polysiloxane with tertiary amine groups as claimed in claim 7, wherein in Equation (2), further includes using a basic catalyst or a Lewis acid catalyst.

14. A polysiloxane with tertiary amine groups, where said polysiloxane being represented by the following structure:

(VII)

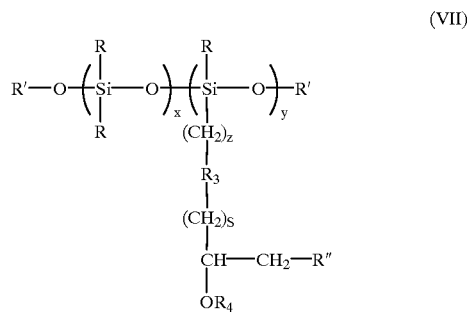

wherein:

(a) R' is a $C_1$ to $C_4$ alkyl group;

(b) R is a $C_1$ to $C_4$ alkyl group or phenyl group;

(c) R'' is
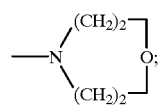
(d) $R_3$ is oxygen or sulfur;
(e) $R_4$ is hydrogen;
(f) X is an integer between 100~400;
(g) Y is an integer between 5~100;
(h) Z is an integer between 3~5; and
(i) S is the integer 1.
* * * * *